US012754150B2

(12) United States Patent
Isakov et al.

(10) Patent No.: US 12,754,150 B2
(45) Date of Patent: Oct. 6, 2026

(54) OVERLAY TARGET MEASUREMENT AND SHIFT COMPENSATION IN CHARGED PARTICLE SYSTEMS AND RELATED METHODS

(71) Applicant: Applied Materials Israel Ltd., Rehovot (IL)

(72) Inventors: Igor Isakov, Rehovot (IL); Assaf Duvdevan, Rehovot (IL); Harel Azulay, Rehovot (IL); Udi Abrahamov, Beer Yaakov (IL)

(73) Assignee: Applied Materials Israel Ltd., Rehovot (IL)

( * ) Notice: Subject to any disclaimer, the term of this patent is extended or adjusted under 35 U.S.C. 154(b) by 272 days.

(21) Appl. No.: 18/763,844

(22) Filed: Jul. 3, 2024

(65) Prior Publication Data

US 2026/0009751 A1 Jan. 8, 2026

(51) Int. Cl.
*G01N 23/2206* (2018.01)
*G01N 23/203* (2006.01)
*G01N 23/2251* (2018.01)

(52) U.S. Cl.
CPC ....... *G01N 23/2206* (2013.01); *G01N 23/203* (2013.01); *G01N 23/2251* (2013.01); *G01N 2223/401* (2013.01); *G01N 2223/505* (2013.01); *G01N 2223/6116* (2013.01)

(58) Field of Classification Search
CPC ............. G01N 23/2206; G01N 23/203; G01N 23/2251; G01N 2223/401; G01N 2223/505; G01N 2223/6116; H01J 37/222; H01J 37/244; H01J 37/28; H01J 2237/2444
See application file for complete search history.

(56) References Cited

U.S. PATENT DOCUMENTS

| | | | | |
|---|---|---|---|---|
| 6,674,075 B2 | 1/2004 | Petrov et al. | | |
| 7,847,267 B2 | 12/2010 | Shemesh et al. | | |
| 2012/0049060 A1 * | 3/2012 | Luecken | ................. | H01J 37/05 250/311 |
| 2025/0216521 A1 * | 7/2025 | Gangundi | ............... | G01S 17/87 |

* cited by examiner

*Primary Examiner* — Robert H Kim
(74) *Attorney, Agent, or Firm* — Kilpatrick Townsend & Stockton LLP

(57) ABSTRACT

A method and system that compensate for differences in response times of different types of sensors of a charged particle system. This involves obtaining first and second secondary electron images and backscattered electron images of an overlay target, scanned with an illuminating electron beam in accordance with first and second scan patterns. A secondary electron shift and a backscattered electron shift are determined based on a registration between the first and a rotated second images. A compensation shift is determined based on these shifts. The images are acquired using a pixel grab period lower than a response period of a backscattered electron sensor used to generate the first backscattered electron image.

20 Claims, 5 Drawing Sheets

100

300

OVERLAY TARGET MEASUREMENT AND SHIFT COMPENSATION IN CHARGED PARTICLE SYSTEMS AND RELATED METHODS

BACKGROUND OF THE INVENTION

In the field of semiconductor manufacturing, overlay targets are commonly used to align different layers of a semiconductor device. These targets typically include a first pattern of a first layer and a second pattern of a second layer located below the first layer. Overlay measurements are often executed by a charged particle system that scans the overlay target with an illuminating electron beam. This scanning process provides a secondary electron image and a backscattered electron image of the overlay target. The secondary electrons detected are indicative of the first pattern, while the backscattered electrons detected are indicative of both the first and second patterns.

However, the response period of the secondary electron sensor is typically much lower than that of the backscattered electron sensor.

This discrepancy can introduce a time shift, which in turn causes a spatial shift between the secondary electron image and the backscattered electron image of the overlay target. This shift can be influenced by the working point of the charged particle system and the image grab rate. Consequently, this can lead to inaccuracies in the overlay measurements, which can impact the overall quality and performance of the semiconductor device.

BRIEF SUMMARY OF THE INVENTION

There is provided a system for compensating for response times of different types of sensors of a charged particle system, the system includes: (a) a memory unit configured to store a first secondary electron image of an overlay target, a first backscattered electron image of the overlay target, a second secondary electron image of the overlay target and a second backscattered electron image of the overlay target, wherein the first secondary electron image is indicative of secondary electrons emitted from the overlay target due to a scanning the overlay target with an illuminating electron beam in accordance with a first scan pattern, the first backscattered electron image is indicative of backscattered electrons emitted from the overlay target due to the scanning the overlay target with the illuminating electron beam in accordance with the first scan pattern, the second secondary electron image is indicative of secondary electrons emitted from the overlay target due to a scanning the overlay target with the illuminating electron beam in accordance with a second scan pattern that is opposite to the first scan pattern, and the second backscattered electron image is indicative of backscattered electrons emitted from the overlay target due to the scanning the overlay target with the illuminating electron beam in accordance with the second scan pattern; and (b) a processing circuit that is configured to: determine a secondary electron shift based on a registration between the first secondary electron image and a rotated second secondary electron image; determine a backscattered electron shift based on a registration between the first backscattered electron image and a rotated second backscattered electron image; and determine a compensation shift applicable to future acquired backscattered electron images based on the backscattered electron shift and the secondary electron shift, wherein the images are acquired using a pixel grab period that is lower than a response period of the backscattered electron sensor used to generate the first backscattered electron image.

There is provided a method for compensating for differences in response times of different types of sensors of a charged particle system, the method includes: (a) obtaining a first secondary electron image of an overlay target and a first backscattered electron image of the overlay target, the first secondary electron image is indicative of secondary electrons emitted from the overlay target due to a scanning the overlay target with an illuminating electron beam in accordance with a first scan pattern, the first backscattered electron image is indicative of backscattered electrons emitted from the overlay target due to the scanning the overlay target with the illuminating electron beam in accordance with the first scan pattern; (b) obtaining a second secondary electron image of the overlay target and a second backscattered electron image of the overlay target, the second secondary electron image is indicative of secondary electrons emitted from the overlay target due to a scanning the overlay target with the illuminating electron beam in accordance with a second scan pattern that is opposite to the first scan pattern, the second backscattered electron image is indicative of backscattered electrons emitted from the overlay target due to the scanning the overlay target with the illuminating electron beam in accordance with the second scan pattern; (c) determining a secondary electron shift based on a registration between the first secondary electron image and a rotated second secondary electron image; (d) determining a backscattered electron shift based on a registration between the first backscattered electron image and a rotated second backscattered electron image; and (c) determining a compensation shift for compensating for the differences in the response times of different types of sensors based on the backscattered electron shift and the secondary electron shift; wherein the first secondary electron image, the second secondary electron image, the first backscattered electron image and the second backscattered electron image are acquired using a pixel grab period that is lower than a response period of a backscattered electron sensor used to generate the first backscattered electron image.

There is provided a non-transitory computer readable medium having instructions stored thereon that, when executed by a processor, cause a system to (a) obtain a first secondary electron image of an overlay target and a first backscattered electron image of the overlay target, the first secondary electron image is indicative of secondary electrons emitted from the overlay target due to a scanning the overlay target with an illuminating electron beam in accordance with a first scan pattern, the first backscattered electron image is indicative of backscattered electrons emitted from the overlay target due to the scanning the overlay target with the illuminating electron beam in accordance with the first scan pattern; (b) obtain a second secondary electron image of the overlay target and a second backscattered electron image of the overlay target, the second secondary electron image is indicative of secondary electrons emitted from the overlay target due to a scanning the overlay target with the illuminating electron beam in accordance with a second scan pattern that is opposite to the first scan pattern, the second backscattered electron image is indicative of backscattered electrons emitted from the overlay target due to the scanning the overlay target with the illuminating electron beam in accordance with the second scan pattern; (c) determine a secondary electron shift based on a registration between the first secondary electron image and a rotated second secondary electron image, (d) determine a backscattered electron shift based on a registration between the first backscattered electron image and a rotated second backscattered electron image; and (c) determine a compensation shift for compensating for the differences in the response times of different types of sensors based on the backscattered electron shift and the secondary electron shift, and wherein the first secondary electron image, the second secondary electron image, the first backscattered electron image and the second backscattered electron image are acquired using a pixel grab period that is lower than a response period of a backscattered electron sensor used to generate the first backscattered electron image.

BRIEF DESCRIPTION OF THE DRAWINGS

The subject matter regarded as the invention is particularly pointed out and distinctly claimed in the concluding portion of the specification. The invention, however, both as to organization and method of operation, together with specimen s, features, and advantages thereof, may best be understood by reference to the following detailed description when read with the accompanying drawings in which:

Figure 1:
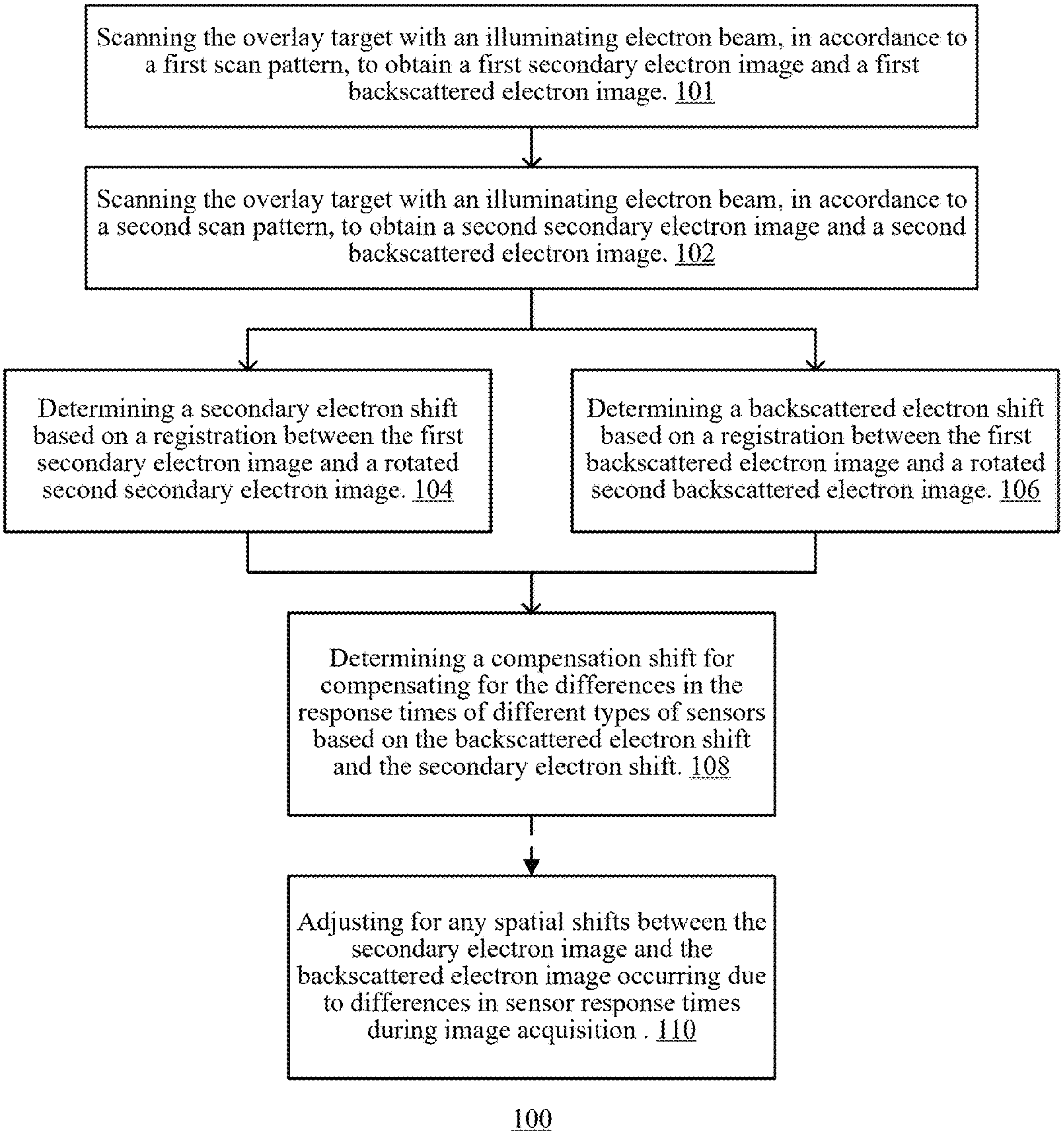
FIG. 1 illustrates an example of a method according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

There are provided a method a system and a non-transitory computer readable medium for compensating for differences in response times of different types of sensors of a charged particle system.

FIG. 1 is an example of method 100.

According to an embodiment, method 100 includes step 101 that involves the operation of a charged particle system that directs an electron beam onto an overlay target to obtain two distinct images: a first secondary electron image and a first backscattered electron image. The overlay target comprises a first pattern on a first layer and a second pattern on a second layer.

The electron beam interacts with the overlay target, causing the emission of secondary electrons, which are detected to form the first secondary electron image. This image provides information about the surface features of the first pattern.

Concurrently, backscattered electrons, which originate from both the first and second patterns, are detected to form the first backscattered electron image. This image yields information about the features of both the surface and subsurface layers. The detection of these electrons is facilitated by a sensor that may include components such as a scintillator and a photomultiplier tube.

The process of obtaining these images is conducted in parallel, ensuring that the temporal relationship between the two types of images is maintained. This is beneficial for the accurate determination of shifts between the images. The images are either generated or received during method 100.

Subsequent steps involve the determination of shifts between the first images and their corresponding second images, which are obtained by scanning the overlay target with the electron beam following a second scan pattern that is opposite to the first. These shifts are used to calculate a compensation shift, as outlined in Step 108, which addresses the time shift introduced when images are acquired at a pixel grab period lower than the response period of the backscattered electron sensor.

The compensation shift is determined based on the differences between the secondary electron shift and the backscattered electron shift, which are calculated in Steps 104 and 106, respectively. The second images are rotated by one hundred and eighty degrees for registration purposes.

In summary, method 100 describe the process of scanning an overlay target with an electron beam, detecting emitted electrons, and obtaining images that are used to determine the necessary compensation for differences in sensor response times during overlay measurements.

Step 102 involves the operation of a charged particle system to scan an overlay target with an electron beam following a second scan pattern that is the reverse of the first scan pattern used in Step 101. The overlay target consists of a first pattern on a first layer and a second pattern on a second layer. The electron beam, when directed at the overlay target using the second scan pattern, facilitates the capture of a second set of images, specifically a second secondary electron image and a second backscattered electron image.

The second secondary electron image reflects secondary electrons emitted from the overlay target, which primarily represent the surface features of the first pattern of the first layer. The second backscattered electron image provides information about both the first and second patterns, as backscattered electrons are sensitive to the composition and variations in thickness of the overlay target, including the second layer beneath the first.

The response period of the sensor detecting secondary electrons is lower than that of the sensor detecting backscattered electrons. By comparing the first and second images from opposite scan patterns, the system can determine the shift associated with secondary electrons (Step 104) and the shift associated with backscattered electrons (Step 106). These shifts are then used to calculate a compensation shift (Step 108).

The components involved in Step 102 include the charged particle system, the overlay target, the electron beam, and the sensors for detecting secondary and backscattered electrons. The charged particle system controls the electron beam and the sensors, while the overlay target is the subject of the scanning process. The electron beam scans the overlay target in accordance with the defined scan patterns, and the sensors detect the emitted electrons to form the images. The purpose of these procedures is to measure the overlay between the patterns of different layers with precision, which is necessary for the production of semiconductor devices. The compensation for the time shift ensures that the overlay measurements are accurate, which is essential for the functionality and quality of the semiconductor devices.

Step 104 entails determining a shift based on the alignment of a first image and a rotated second image, both representing secondary electron emissions from an overlay target when scanned by an electron beam. The process begins with the acquisition of the first images following a scan pattern (step 101). This image captures the emissions resulting from the interaction of the electron beam with the overlay target's upper layer. Subsequently, second images are obtained using an opposite scan pattern (Step 102). These second images are then rotated by one hundred and eighty degrees to align with the first images orientation.

The alignment or registration process involves overlaying the first image and the rotated second image to identify any displacement between them. This displacement, measured after the alignment, is the secondary electron shift that needs to be determined in Step 104. The measurement of this secondary electron shift is facilitated by computational algorithms that can account for differences in translation, rotation, and scale between the two images.

The charged particle system, the overlay target, the electron beam, the detector that captures the emissions, and the computational algorithms for image alignment are involved in this step. The objective is to measure the compensation shift accurately, which is necessary for calculating the shift to be applied to future acquired images (Step 108). This calculation is beneficial for overlay measurements, which are used in the manufacturing processes of layered structures.

Step 106 entails determining a backscattered electron shift based on the alignment of a first backscattered electron image with a rotated second backscattered electron image. This step is part of a method that compensates for the different response times between two types of sensors in a charged particle system. The two types of sensors include a secondary electron sensor and a backscattered electron sensor.

Steps 104 and 106 are followed by step 108 of compensation Shift Calculation. The backscattered electron shift (of step 106) is used along with the secondary electron shift (of Step 104) to calculate (in step 108) a compensation shift.

According to an embodiment, the compensation shift is a function of the backscattered electron shift and of the secondary electron shift. For example, a function of a difference between the secondary electron shift and the backscattered electron shift. For example, half (or any other factor) of the difference between the secondary electron shift and the backscattered electron shift.

Step 108 involves calculating a compensation shift to address the differences in response times between two types of sensors within a charged particle system. This step is necessary for accurate overlay measurements when scanning a overlay target that includes patterns from different layers.

The process begins with the charged particle system scanning the overlay target with an electron beam, during which sensors detect secondary and backscattered electrons. The secondary electron sensor, with a lower response period, detects electrons that provide information about the pattern of the first layer. Conversely, the backscattered electron sensor, with a longer response period, detects electrons that provide information about the patterns of both the first and second layers.

The compensation shift is based on the shifts identified in the secondary electron images and backscattered electron images. These images are obtained by scanning the overlay target with an electron beam following specific scan patterns (Step 101, Step 102). The secondary electron shift is determined by registering the first secondary electron image with a rotated second secondary electron image (Step 104), and the backscattered electron shift is determined by registering the first backscattered electron image with a rotated second backscattered electron image (Step 106).

According to an embodiment, steps 101, 102, 104, 106 and 108 are executed for different working points of a charge particle system to provide compensations shifts for different working points.

According to an embodiment, a working point is defined by the combination of the current value of the electron beam and the landing energy value of the electrons.

The repetition of steps 101 to 108 for different working points ensures that the compensation is accurate across different operational settings of the charged particle system.

According to an embodiment, steps 101 to 108 are repeated for different image grab rate.

The components involved in these steps are the overlay target, the system, the electron beam, the secondary electron sensor, the backscattered electron sensor, and the processing circuit or processor that performs the calculations.

According to an embodiment, steps 101 and 102 are executed using a pixel grab period that is shorter than the response period of a backscattered electron sensor. This process is conducted by a charged particle system, which scans an overlay target with an electron beam. The overlay target consists of patterns from different layers of a semiconductor wafer. As the electron beam interacts with the overlay target, it causes the emission of secondary electrons and backscattered electrons. These electrons are detected by their respective sensors to create images that represent the patterns of the overlay target.

The secondary electron detector captures secondary electrons to form an image, which indicates the pattern of the top layer of the overlay target. The backscattered electron sensor captures backscattered electrons to form an image, which provides information about both the top and underlying patterns.

The pixel grab period is the interval at which the system captures a pixel from the sensors. The response period of the backscattered electron sensor is the time it takes for this sensor to react to the incoming electrons and provide a signal. When the pixel grab period is shorter than the response period of the backscattered electron sensor, a time shift can occur, leading to a spatial misalignment between the images.

According to an embodiment, the backscattered electron sensor includes a scintillator and a photomultiplier tube. The scintillator is a material that fluoresces upon interaction with backscattered electrons, converting their kinetic energy into visible light. The photomultiplier tube then amplifies this light signal into an electrical signal that can be quantified and analyzed.

Backscattered electrons are produced when an illuminating electron beam interacts with the atoms of the overlay target, causing some electrons to scatter back towards the surface. These electrons are detected by the backscattered electron sensor. The scintillator's role is to emit photons in response to the backscattered electrons. The photomultiplier tube detects these photons and amplifies the resulting signal to produce a measurable output that reflects the patterns present on the overlay target.

The use of a scintillator and a photomultiplier tube is to convert the backscattered electrons into an electrical signal that can be used to generate an image of the overlay target. This image contains data about the topography and composition of the patterns, which is necessary for overlay measurements. The design of the backscattered electron sensor, including the scintillator material and the photomultiplier tube configuration, is tailored to provide sensitivity and resolution while reducing noise.

The performance of the backscattered electron sensor affects the accuracy of the backscattered electron shift determination (Step 106) and the subsequent calculation of the compensation shift (Step 108). The compensation shift is used to adjust for any spatial shifts between the secondary electron image and the backscattered electron image that may occur due to differences in sensor response times during image acquisition (Step 110).

Referring to the working point for a charged particle system—the working point consists of two parameters: the current value of the illuminating electron beam and the landing energy value of the electrons. The current value determines the number of electrons in the beam, which influences the intensity and resolution of the images produced. The landing energy value affects the depth at which electrons penetrate the overlay target and the types of interactions that occur, which in turn influence the generation of secondary and backscattered electrons.

Adjustments to the current value and landing energy value allow for optimization of the charged particle system for different tasks. These adjustments are made based on the requirements of the measurement task, such as the materials in the overlay target and the desired resolution. The working point can be dynamically adjusted during the scanning process to accommodate changes in the overlay target or to optimize imaging for different areas of the overlay target.

The working point is selected to ensure that the electrons have the appropriate energy to interact with the overlay target to the desired depth without causing damage or excessive scattering that could degrade image quality. By controlling the working point, the system can maintain high-quality imaging across the entire overlay target and ensure accurate overlay measurements.

According to an embodiment, the first scan pattern consists of scan lines that move in one direction across an overlay target, while the second scan pattern consists of scan lines that move in the opposite direction.

The charged particle system, under the control of its programming, directs the electron beam to follow these scan patterns. The overlay target comprises patterns from two different layers, and the electron beam interaction with these patterns results in the emission of secondary electrons and backscattered electrons. These emissions are captured to form images that represent the patterns on the overlay target.

The use of two opposing raster scan patterns serves to address potential systematic errors that could arise from the scanning process. By scanning in both directions, any directional artifacts can be identified and accounted for in the analysis of the images. This step is beneficial for the subsequent analysis steps, which include the determination of shifts between the images obtained from the different scan patterns.

The images produced from these scan patterns are then used in Step 104 to determine a shift related to the secondary electrons, and in Step 106 to determine a shift related to the backscattered electrons. These shifts are used in Step 108 to calculate a compensation shift that accounts for the different response times of the sensors used to detect secondary and backscattered electrons. The compensation shift is applied to future acquired backscattered electron images to ensure accurate overlay measurements. The accurate measurement of overlay targets is necessary for the precise fabrication of layered materials and structures.

According to an embodiment, the second secondary electron image and the second backscattered electron image are rotated by one hundred and eighty degrees. This rotation is performed by a processing circuit or software within the charged particle system. The purpose of this rotation is to align the images obtained from opposite scan patterns (Step 116) to measure the shifts caused by the different response times of the sensors accurately.

The rotation of the second images by one hundred and eighty degrees allows an alignment of features in the overlay target's patterns is necessary for precise registration and comparison.

The rotation enables the determination of the secondary electron shift (Step 104) and the backscattered electron shift (Step 106), which are used to calculate the compensation shift (Step 108).

The process of rotating the images is a mathematical transformation that reorients the pixel matrix of the images. Image processing algorithms typically execute this transformation, handling two-dimensional data transformations. The rotation ensures consistent positioning of features in the overlay target's patterns in both sets of images, despite the change in scan direction.

Steps 104, 106 and 108 are executed by a processor following instructions stored on a computer-readable medium. This step translates the methodological steps into tasks that a computer system can perform to compensate for the differences in response times of different types of sensors in a charged particle system.

The execution of instructions by a processor refers to the operation where a central processing unit (CPU) or a dedicated processor reads and performs operations specified by a set of instructions or a program. These instructions are encoded in a format that the processor can understand and are stored on a medium, such as a hard drive, solid-state drive, or memory device. The processor carries out the instructions as dictated by control flow statements within the program.

The instructions that the processor executes in this step are designed to implement the method for compensating for sensor response time differences. This includes obtaining secondary electron and backscattered electron images of an overlay target, determining shifts based on image registration, and calculating a compensation shift. The instructions ensure that the processor performs these tasks accurately and efficiently, taking into account various parameters and conditions, such as the pixel grab period, the working points of the charged particle system, and the specific scan patterns used.

Involved in this step are the processor, the medium, and the stored instructions. The processor is the component that performs computations and controls the operation of the system. The medium provides the storage for the instructions that the processor will execute. The instructions themselves are the encoded directives that guide the processor through the method's steps.

The goal of this step is to automate the method for compensating for sensor response time differences, ensuring that the charged particle system can measure overlay targets with precision and reliability. By executing these instructions, the processor enables the system to adjust for time shifts between secondary electron and backscattered electron images, which is essential for accurate overlay measurements in semiconductor manufacturing processes.

Figure 2:
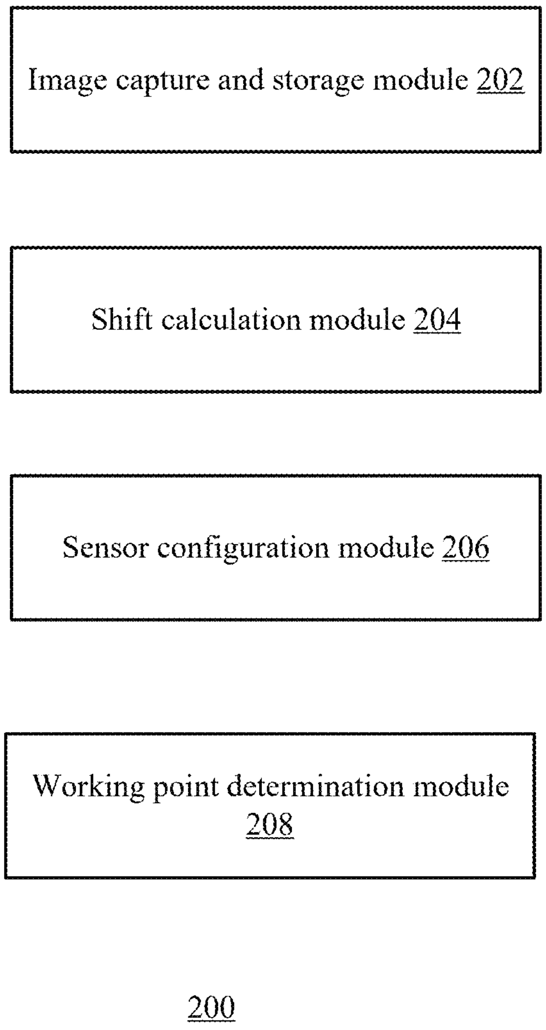
FIG. 2 illustrates an example of a charged particle system according to some embodiments.

FIG. 2 is an example of a charged particle system (200) for sensor response time compensation that is designed for precise overlay measurements in semiconductor manufacturing. It includes the Image Capture and Storage Module (202), which is tasked with acquiring and storing images for overlay target analysis. The Image Capture and Storage Module is configured to produce the images necessary for the system's function.

The Image Capture and Storage Module (202) operates by scanning an overlay target with an electron beam in predetermined patterns to generate secondary electron images and backscattered electron images. These images are indicative of the overlay target's patterns and are captured following a first scan pattern and then a second scan pattern that is opposite to the first. The images are stored for subsequent analysis.

The Shift Calculation Module (204) processes the stored images to determine spatial shifts. This is achieved by registering and comparing the first and second images of each type after rotating them for alignment. The analysis identifies the shifts caused by the different response times of the sensors detecting secondary and backscattered electrons.

The system also comprises a Sensor Configuration Module (206) and a Working Point Determination Module (208) that sets the operational parameters, such as the current and landing energy of the electron beam, which influence the quality of the images and the accuracy of the shift calculations.

The system's process compensates for time shifts that occur when images are acquired at a pixel grab period shorter than the response period of the backscattered electron sensor. This compensation ensures the accuracy of overlay measurements, which are necessary for the fabrication of semiconductor devices.

The Image Capture and Storage Module (202) serves as a component within the charged particle system, responsible for the acquisition and storage of images for analysis. This module also generates images through the scanning of an overlay target with an illuminating electron beam. The overlay target comprises a first pattern on a first layer and a second pattern on a second layer. The scanning is executed following a first scan pattern and a second scan pattern, which is the reverse of the first, to ensure complete coverage of the target. This process results in the capture of secondary electron images, which are indicative of the upper layer pattern, and backscattered electron images, which represent patterns from both layers.

The images are stored in a memory unit within the module, with the first secondary electron image being stored concurrently with the first backscattered electron image. This simultaneous storage is necessary to maintain data integrity due to the differing response times of the sensors detecting the secondary and backscattered electrons. The images are acquired using a pixel grab period shorter than the response period of the backscattered electron sensor, leading to a time shift between the secondary electron image and the backscattered electron image. This necessitates the calculation of a compensation shift to correctly align the images for accurate overlay measurements.

The Image Capture and Storage Module (202) thus plays a role in both the acquisition and preliminary processing of the images, which is essential for the subsequent steps of shift calculation and compensation adjustment within the charged particle system. The module's functionality is integral to the system's ability to perform precise overlay measurements and to compensate for sensor response time differences.

The shift calculation module (204) is designed for calculating shifts in electron imaging within a charged particle system. This module is essential for addressing discrepancies in sensor response times during the imaging process.

The shift calculation module (204) consists of mechanisms that calculate spatial discrepancies between secondary and backscattered electron images. After an overlay target is scanned by an illuminating electron beam following specific scan patterns, two distinct images are produced. The first image reflects secondary electrons emitted from the overlay target, while the second image reflects backscattered electrons. These images are captured using a pixel grab period set below the response period of the backscattered electron sensor to facilitate timely acquisition.

The shift calculation module's operation begins with the determination of the secondary electron shift by registering a first secondary electron image with a rotated version of a second secondary electron image, typically rotated by 180 degrees for alignment. In a similar manner, the backscattered electron shift is determined by registering the first backscattered electron image with its rotated version.

Subsequently, the shift calculation module (204) calculates the compensation shift, which is used to adjust future image captures and ensure that temporal discrepancies between sensor responses do not impact measurement accuracy. The compensation shift may be computed as half the difference between the secondary and backscattered electron shifts, as a function of these shifts, or across multiple working points of the system.

The precise calculations performed by the shift calculation module (204) enable the system to provide accurate overlay target analysis, which is utilized in fields such as semiconductor manufacturing and materials science.

The Sensor Configuration Module (206) is a part of the charged particle system that configures the secondary electron sensor and the backscattered electron sensor. These sensors are equipped with a scintillator and a photomultiplier tube, which are responsible for converting incoming electrons into photons and amplifying these photons to produce a detectable signal, respectively. The secondary electron sensor is designed to detect secondary electrons emitted from the overlay target's first pattern, while the backscattered electron sensor detects electrons from both the first and second patterns.

The module operates under conditions where the response period of the secondary electron sensor is less than that of the backscattered electron sensor. This difference in response times can lead to a spatial shift between the secondary electron image and the backscattered electron image when images are acquired at a pixel grab period that is less than the response period of the backscattered electron sensor.

To address this, the Sensor Configuration Module adjusts the sensors' settings to compensate for the time shift. This adjustment is necessary when the system operates at different working points, defined by the combination of the current of the illuminating electron beam and the landing energy of the electrons. By adjusting the sensors' response times, the module ensures that the captured images are synchronized, facilitating accurate overlay target analysis and shift determination.

The Working Point Determination Module (208) serves a specific function within the context of a charged particle system. It is responsible for determining the operational parameters, such as the current of the illuminating electron beam and the landing energy of the electrons. These parameters are referred to as the working point and are adjusted to optimize the system's performance.

The Working Point Determination Module (208) calculates the compensation shift necessary for accurate overlay measurements. This calculation accounts for the response characteristics of the secondary electron and backscattered electron sensors. The working point is calculated for multiple settings to ensure functionality across various conditions. By adjusting the working point, the module addresses the time shift caused by the differing response times of the sensors, particularly when operating at a pixel grab period lower than the response period of the backscattered electron sensor.

The Working Point Determination Module (208) is part of a larger system that includes the Image Capture and Storage Module (202), which is responsible for acquiring and storing images, and the Shift Calculation Module (204), which calculates the shifts based on image registration. The Sensor Configuration Module (206) configures the sensors, taking into account their response times. Together, these components work in concert to maintain the precision of measurements within the charged particle system.

Figure 3:
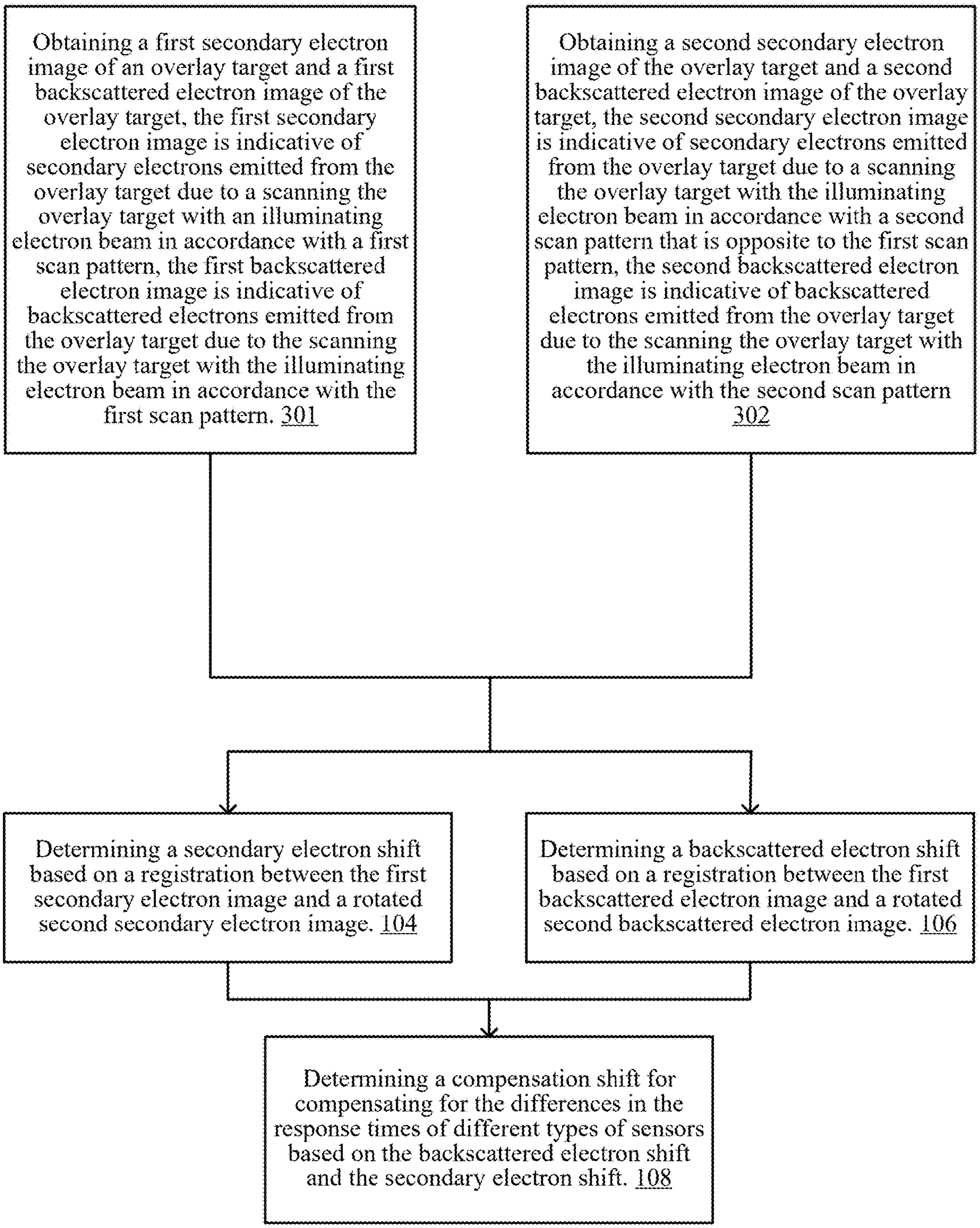
FIG. 3 illustrates an example of a method according to some embodiments.

FIG. 3 is an example of method 300.

According to an embodiment, method 300 starts by steps 301 and 302.

According to an embodiment, steps 301 and 302 are followed by steps 104 and 106.

According to an embodiment, step 104 includes determining a secondary electron shift based on a registration between the first secondary electron image and a rotated second secondary electron image.

According to an embodiment, step 106 includes determining a backscattered electron shift based on a registration between the first backscattered electron image and a rotated second backscattered electron image.

According to an embodiment, steps 104 and 106 are followed by step 108 of determining a compensation shift for compensating for the differences in the response times of different types of sensors based on the backscattered electron shift and the secondary electron shift.

According to an embodiment, step 301 includes obtaining a first secondary electron image of an overlay target and a first backscattered electron image of the overlay target, the first secondary electron image is indicative of secondary electrons emitted from the overlay target due to a scanning the overlay target with an illuminating electron beam in accordance with a first scan pattern, the first backscattered electron image is indicative of backscattered electrons emitted from the overlay target due to the scanning the overlay target with the illuminating electron beam in accordance with the first scan pattern.

According to an embodiment, step 302 includes obtaining a second secondary electron image of the overlay target and a second backscattered electron image of the overlay target, the second secondary electron image is indicative of secondary electrons emitted from the overlay target due to a scanning the overlay target with the illuminating electron beam in accordance with a second scan pattern that is opposite to the first scan pattern, the second backscattered electron image is indicative of backscattered electrons emitted from the overlay target due to the scanning the overlay target with the illuminating electron beam in accordance with the second scan pattern;

The obtaining of steps 301 and/or step 302 may include generating—for example executing steps 101 and 102 of method 100.

Alternatively, the obtaining includes receiving or retrieving the images-especially without using the optics of a charged particle system.

Figure 4:
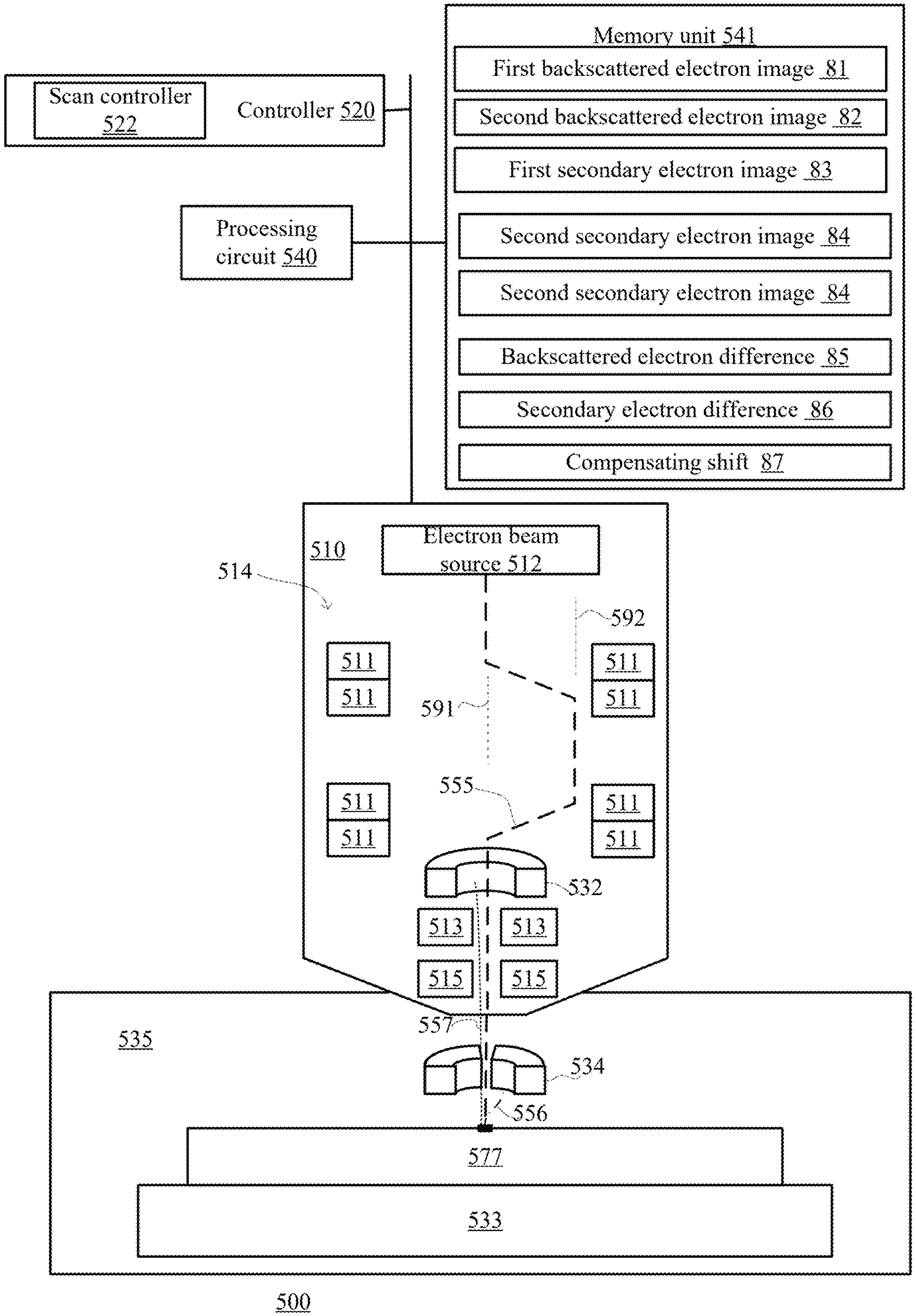
FIG. 4 illustrates an example of a charged particle system according to some embodiments.

FIG. 4 is an example of charged particle system 500.

The charged particle system 500 includes:

a. Column 510.

b. Memory unit 541 for storing instructions and data.

c. Controller 520, that includes scan controller 522 that is configured to generate control signals that control the scanning of an overlay target by an illumination electron beam.

d. A sensing unit that includes secondary electron sensor 532 (for sensing secondary electrons 557) and backscattered electron sensor 534 (for sensing backscattered electrons 556).

e. A processing circuit 540 that is configured to execute at least steps 104, 106 and 108. According to an embodiment, the processing circuit is also configured to generate images based on detection signals from the sensing unit. The processing circuit 540 may include an array of integrated circuits such as graphic processors, general purpose processors, and the like.

f. Vacuum chamber 535 in which the sample is located.

g. Mechanical stage 533 for supporting the sample and moving a sample 577 that includes the overlay target.

The column 510 includes electron optics such as electron beam source 512 and electron beam manipulation optics 514.

The electron beam manipulation optics 514 is configured to propagate the illuminating electron beam 555 through the column (for example while bypassing mirror 23) till exiting from the column.

The electron beam manipulation optics 514 may include deflection lenses, focusing lenses, electron beam collimating optics, electron beam shaping optics, and the like. Examples of a column 510 that includes multiple deflection coils for double-deflecting an electron beam are illustrated in U.S. Pat. No. 7,847,267 of Shemesh et al.

FIG. 4 illustrates the electron beam manipulation optics 514 as including:

a. Bypass magnetic scan coils 511 that are configured to direct the electron beam along a bypass path.

b. Objective lens 513 that is configured to focus the electron beam on the overlay target of sample 577.

c. Deflector lenses 515 for deflecting the electron beam according to a scan pattern.

The optical axis 591 of the illuminating electron beam 555 is a vertical axis through which the electron beam propagated before the bypassing of the mirror and after the bypassing of the mirror.

The bypass magnetic scan coils 511 are configured to: (i) tilt the illuminating electron beam 555 at a first direction, (ii) tilt the illuminating electron beam 555 at an opposite direction such as to propagate along a secondary optical axis 592 that is parallel to the optical axis but spaced apart from the optical axis, (iii) tilt the illuminating electron beam at a second direction, towards the optical axis, and (iv) tilt the illuminating electron beam 555, at a direction opposing the second direction, such as to propagate along the optical axis. A system and method for double tilt is described in U.S. Pat. No. 6,674,075 of Petrov et al. and is incorporated herein by reference.

FIG. 4 illustrates the memory unit 541 as storing:

a. First backscattered electron image 81.

b. Second backscattered electron image 82.

c. First secondary electron image 83.

d. Second secondary electron image 84.

e. Backscattered electron difference 85.

f. Secondary electron difference 86.

g. Compensating shift 87.

The charged particle system may also include a vacuum system (not shown) configured to maintain the column is maintained in vacuum, a high power supply unit (not shown) configured to provide high voltage signals to accelerate the electron beam and to decelerate the electron beam.

Figure 5:
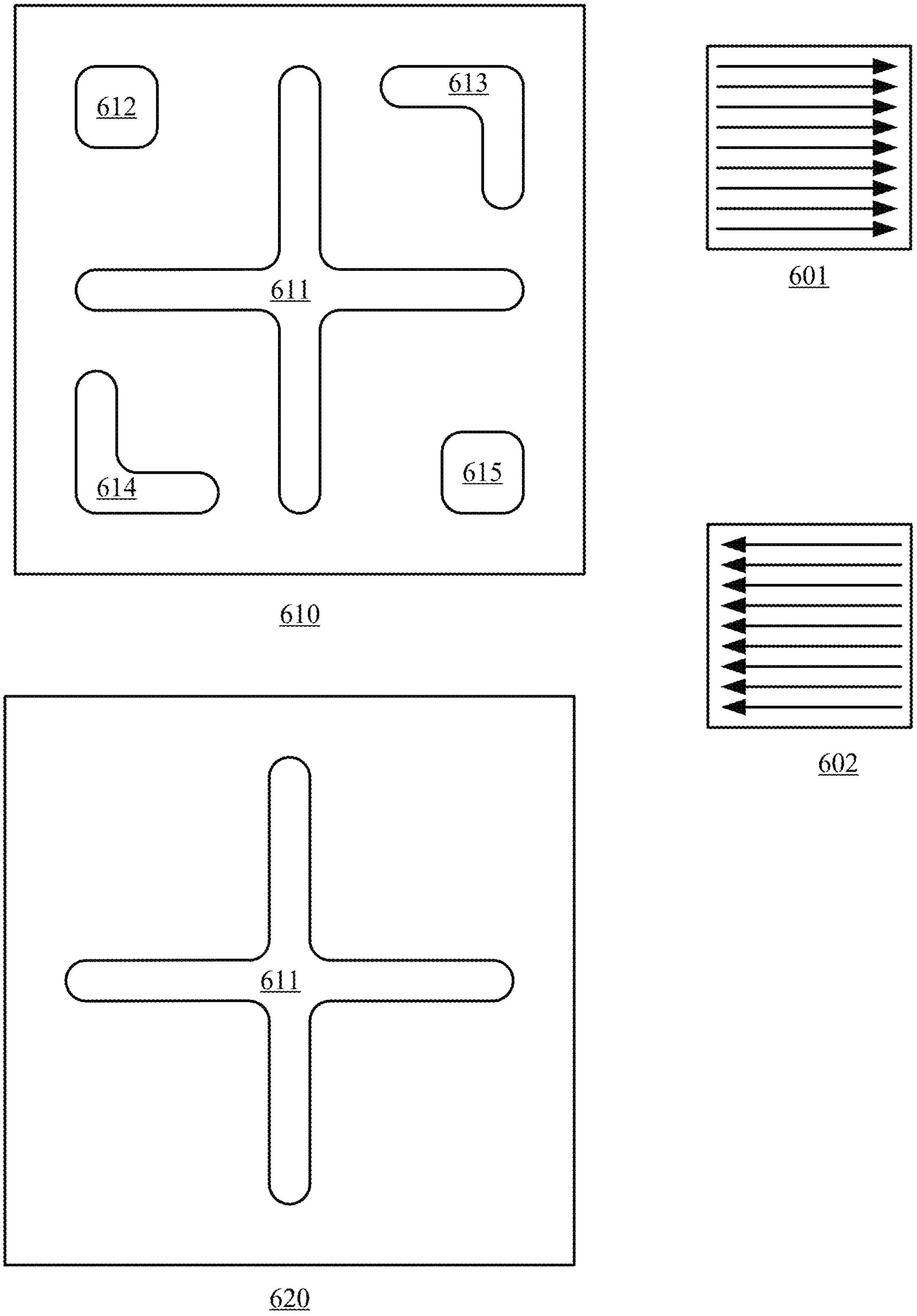
FIG. 5 illustrates an example of a backscattered image, a secondary electron image, a first scan pattern and a second scan pattern according to some embodiments.

FIG. 5 illustrates examples of backscattered image of an overlay target 610 that illustrates first layer cross 611 and second layer patterns 612, 613, 614 and 615. The second layer patterns are not visible in secondary electron image 620. FIG. 5 also illustrates a first scan pattern 601 (the scan lines are illustrated by arrows) and a second scan pattern 602.

In the foregoing detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using optical and/or electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer program product that stores instructions that once executed result in the execution of the method.

Any reference in the specification to a system should be applied mutatis mutandis to a method that may be executed by the system should be applied mutatis mutandis to a computer program product that stores instructions that can be executed by the system.

Any reference in the specification to a computer program product should be applied mutatis mutandis to a method that may be executed when executing instructions stored in the computer program product and should be applied mutandis to a system that is configured to executing instructions stored in the computer program product.

Examples of a charged particle system include (i) a defect review scanning electron microscope SEMVISION™ of APPLIED MATERIALS™ Inc. of San Jose, California, (ii) a metrology system such as the PROVision™ 3E Ebeam™ metrology system of APPLIED MATERIALS™, (iii) an electron beam inspection system such as the PRIMEVISION™ of APPLIED MATERIALS™, or (iv) a critical dimension scanning electron microscope such as the VERITYSEM™ of APPLIED MATERIALS™, and the like. The charge particle system may manufactured by vendors such as HITACHI™ of Tokyo, Japan, or KLA™ Corporation of Milpitas, California, or may be manufactured by other vendors.

In the foregoing specification, the embodiments of the disclosure have been described with reference to specific examples of embodiments. It will, however, be evident that various modifications and changes may be made therein without departing from the broader spirit and scope of the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any reference to the term "comprising" or "having" or "including" should be applied mutatis mutandis to "consisting" and additionally or alternatively should be applied mutatis mutandis to "consisting essentially of".

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for compensating for differences in response times of different types of sensors of a charged particle system, the method comprising:

obtaining a first secondary electron image of an overlay target and a first backscattered electron image of the overlay target, the first secondary electron image is indicative of secondary electrons emitted from the overlay target due to a scanning the overlay target with an illuminating electron beam in accordance with a first scan pattern, the first backscattered electron image is indicative of backscattered electrons emitted from the overlay target due to the scanning the overlay target with the illuminating electron beam in accordance with the first scan pattern;

obtaining a second secondary electron image of the overlay target and a second backscattered electron image of the overlay target, the second secondary electron image is indicative of secondary electrons emitted from the overlay target due to a scanning the overlay target with the illuminating electron beam in accordance with a second scan pattern that is opposite to the first scan pattern, the second backscattered electron image is indicative of backscattered electrons emitted from the overlay target due to the scanning the overlay target with the illuminating electron beam in accordance with the second scan pattern;

determining a secondary electron shift based on a registration between the first secondary electron image and a rotated second secondary electron image;

determining a backscattered electron shift based on a registration between the first backscattered electron image and a rotated second backscattered electron image; and determining a compensation shift for compensating for the differences in the response times of different types of sensors based on the backscattered electron shift and the secondary electron shift; wherein the first secondary electron image, the second secondary electron image, the first backscattered electron image and the second backscattered electron image are acquired using a pixel grab period that is lower than a response period of a backscattered electron sensor used to generate the first backscattered electron image.

2. The method of claim 1, wherein the compensation shift is half of a difference between the backscattered electron shift and the secondary electron shift.

3. The method of claim 1, wherein the compensation shift is calculated for multiple working points of the charged particle system.

4. The method of claim 1, wherein each of the multiple working points is a combination of a current value of the illuminating electron beam and a landing energy value of the illuminating electron beam.

5. The method of claim 1, wherein the backscattered electron sensor includes a scintillator and a photomultiplier tube.

6. The method of claim 1, further comprising obtaining the first secondary electron image in parallel to the obtaining of the first backscattered electron image.

7. The method of claim 1, wherein the compensation shift is a function of a difference between the backscattered electron shift and the secondary electron shift.

8. The method of claim 1, further comprising determining the shift at different pixel grab rates.

9. The method of claim 1, wherein the first scan pattern is a first raster scan pattern that comprises scan lines at a first direction, and the second scan pattern is a second raster scan pattern that comprises scan lines at a second direction that is opposite to the first direction.

10. The method of claim 1, wherein the rotated second image is rotated by one hundred and eighty degrees.

11. The method according to claim 1, wherein the obtaining of the first secondary electron image of the overlay target and of the first backscattered electron image of the overlay target comprises generating the first secondary electron image of the overlay target and the first backscattered electron image of the overlay target.

12. The method according to claim 1, wherein the obtaining of the first secondary electron image of the overlay target and of the first backscattered electron image of the overlay target comprises receiving the first secondary electron image of the overlay target and the first backscattered electron image of the overlay target.

13. A system for compensating for response times of different types of sensors of a charged particle system, the system comprising:

a memory unit configured to store a first secondary electron image of an overlay target, a first backscattered electron image of the overlay target, a second secondary electron image of the overlay target and a second backscattered electron image of the overlay target, wherein the first secondary electron image is indicative of secondary electrons emitted from the overlay target due to a scanning the overlay target with an illuminating electron beam in accordance with a first scan pattern, the first backscattered electron image is indicative of backscattered electrons emitted from the overlay target due to the scanning the overlay target with the illuminating electron beam in accordance with the first scan pattern, the second secondary electron image is indicative of secondary electrons emitted from the overlay target due to a scanning the overlay target with the illuminating electron beam in accordance with a second scan pattern that is opposite to the first scan pattern, and the second backscattered electron image is indicative of backscattered electrons emitted from the overlay target due to the scanning the overlay target with the illuminating electron beam in accordance with the second scan pattern; and a processing circuit that is configured to: determine a secondary electron shift based on a registration between the first secondary electron image and a rotated second secondary electron image; determine a backscattered electron shift based on a registration between the first backscattered electron image and a rotated second backscattered electron image; and determine a compensation shift applicable to future acquired backscattered electron images based on the backscattered electron shift and the secondary electron shift, wherein the images are acquired using a pixel grab period that is lower than a response period of the backscattered electron sensor used to generate the first backscattered electron image.

14. The system of claim 13, wherein the processing circuit is further configured to calculate the compensation shift as half of a difference between the backscattered electron shift and the secondary electron shift.

15. The system of claim 13, wherein the processing circuit is further configured to calculate the compensation shift for multiple working points of the charged particle system.

16. The system of claim 13, wherein each of the working points is a combination of a current value of the illuminating electron beam and a landing energy value of the illuminating electron beam.

17. The system of claim 13, wherein the backscattered electron sensor includes a scintillator and a photomultiplier tube.

18. The system of claim 13, wherein the memory unit is further configured to store the first secondary electron image in parallel to a storage of the first backscattered electron image.

19. The system of claim 13, wherein the processing circuit is further configured to determine the compensation shift as a function of a difference between the backscattered electron shift and the secondary electron shift.

20. A non-transitory computer readable medium for compensating for differences in response times of different types of sensors of a charged particle system, the non-transitory computer readable medium having instructions stored thereon that, when executed by a processor, cause a system to:

obtain a first secondary electron image of an overlay target and a first backscattered electron image of the overlay target, the first secondary electron image is indicative of secondary electrons emitted from the overlay target due to a scanning the overlay target with an illuminating electron beam in accordance with a first scan pattern, the first backscattered electron image is indicative of backscattered electrons emitted from the overlay target due to the scanning the overlay target with the illuminating electron beam in accordance with the first scan pattern;

obtain a second secondary electron image of the overlay target and a second backscattered electron image of the overlay target, the second secondary electron image is indicative of secondary electrons emitted from the overlay target due to a scanning the overlay target with the illuminating electron beam in accordance with a second scan pattern that is opposite to the first scan pattern, the second backscattered electron image is indicative of backscattered electrons emitted from the overlay target due to the scanning the overlay target with the illuminating electron beam in accordance with the second scan pattern;

determine a secondary electron shift based on a registration between the first secondary electron image and a rotated second secondary electron image;

determine a backscattered electron shift based on a registration between the first backscattered electron image and a rotated second backscattered electron image; and determine a compensation shift for compensating for the differences in the response times of different types of sensors based on the backscattered electron shift and the secondary electron shift, and wherein the first secondary electron image, the second secondary electron image, the first backscattered electron image and the second backscattered electron image are acquired using a pixel grab period that is lower than a response period of a backscattered electron sensor used to generate the first backscattered electron image.

* * * * *